(12) United States Patent
Ottesen et al.

(10) Patent No.: US 6,314,377 B1
(45) Date of Patent: Nov. 6, 2001

(54) OPTIMAL LOCATION OF DRIVE ASSEMBLIES WITHIN A MULTIPLE DRIVE ARRAY

(75) Inventors: Hal Hjalmar Ottesen; Gordon James Smith, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/238,316

(22) Filed: Jan. 28, 1999

(51) Int. Cl.[7] ............................. G01F 17/00; G01F 23/00; G01L 7/00
(52) U.S. Cl. ................................. 702/56; 73/578
(58) Field of Search .................. 702/56; 360/97.02, 360/97.03; 73/578

(56) References Cited

U.S. PATENT DOCUMENTS 5,617,425 * 4/1997 Anderson ........................ 371/10.2

\* cited by examiner

Primary Examiner—Marc S. Hoff
Assistant Examiner—Demetrius Pretlow
(74) Attorney, Agent, or Firm—Bracewell & Patterson, LLP

(57) ABSTRACT

A method and system for strategically arranging drive assemblies within a multiple drive array that includes multiple drive locations. First, a vibration classification is assigned to each drive location among a plurality of drive locations within a multiple drive array, each vibration classification corresponding to a range of measurable vibration levels acceptable at each of the plurality of drive locations. Next, an inherent measurable vibration level of a selected drive assembly that will be installed within one of the drive locations is determined. Finally, the inherent measurable vibration level of the selected drive assembly is correlated with a preferred vibration classification of a particular drive location, such that the selected drive assembly may be optimally located within said multiple drive array.

18 Claims, 7 Drawing Sheets

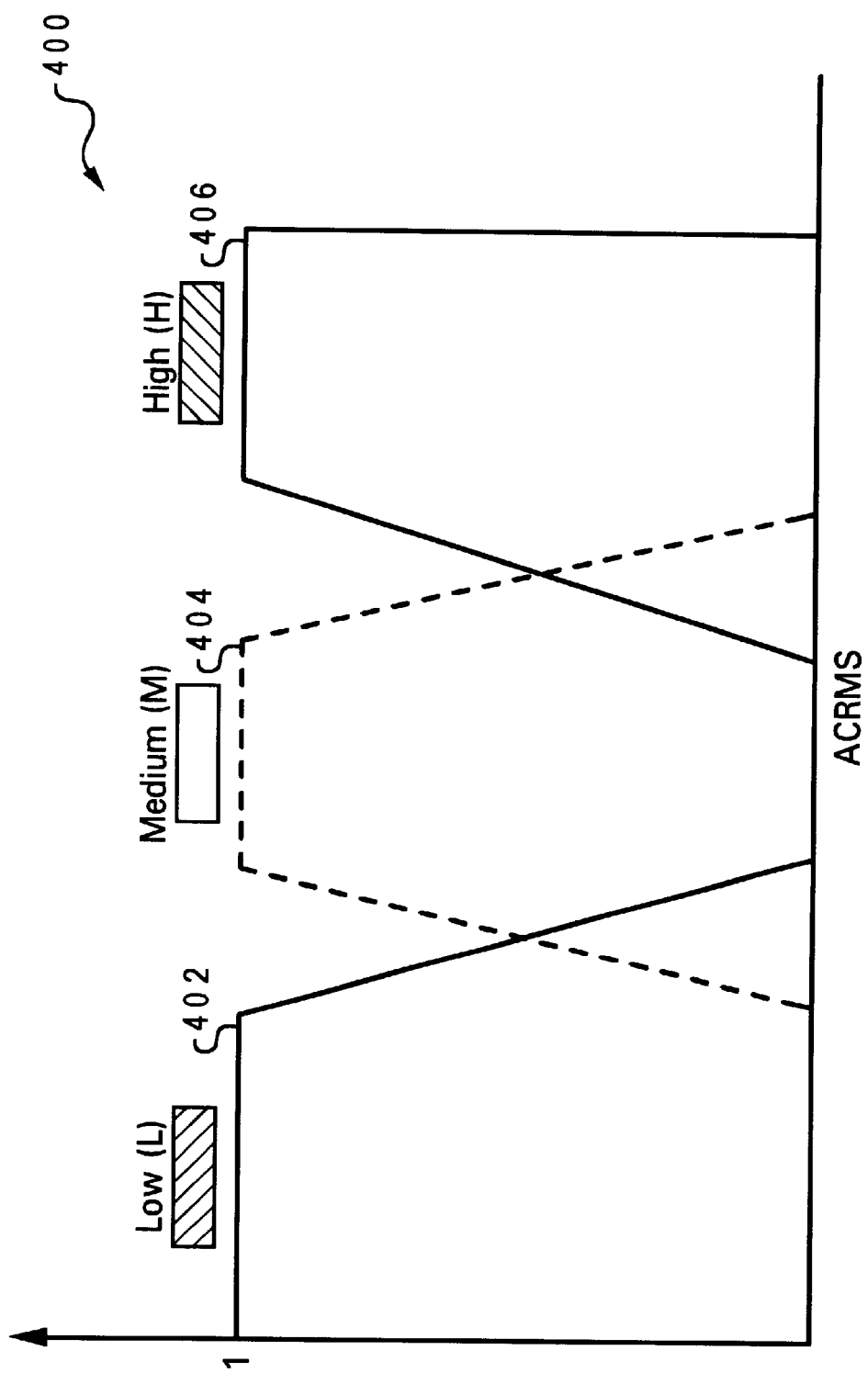

| SLOT | First Choice | Second Choice | Third Choice |
|---|---|---|---|
| (1,1) | H | M | L |
| (1,2) | L | M | H |
| (1,3) | H | M | L |
| (2,1) | M | L | H |
| (2,2) | L | M | H |
| (2,3) | M | L | H |
| (3,1) | H | M | L |
| (3,2) | L | M | H |
| (3,3) | H | M | L |

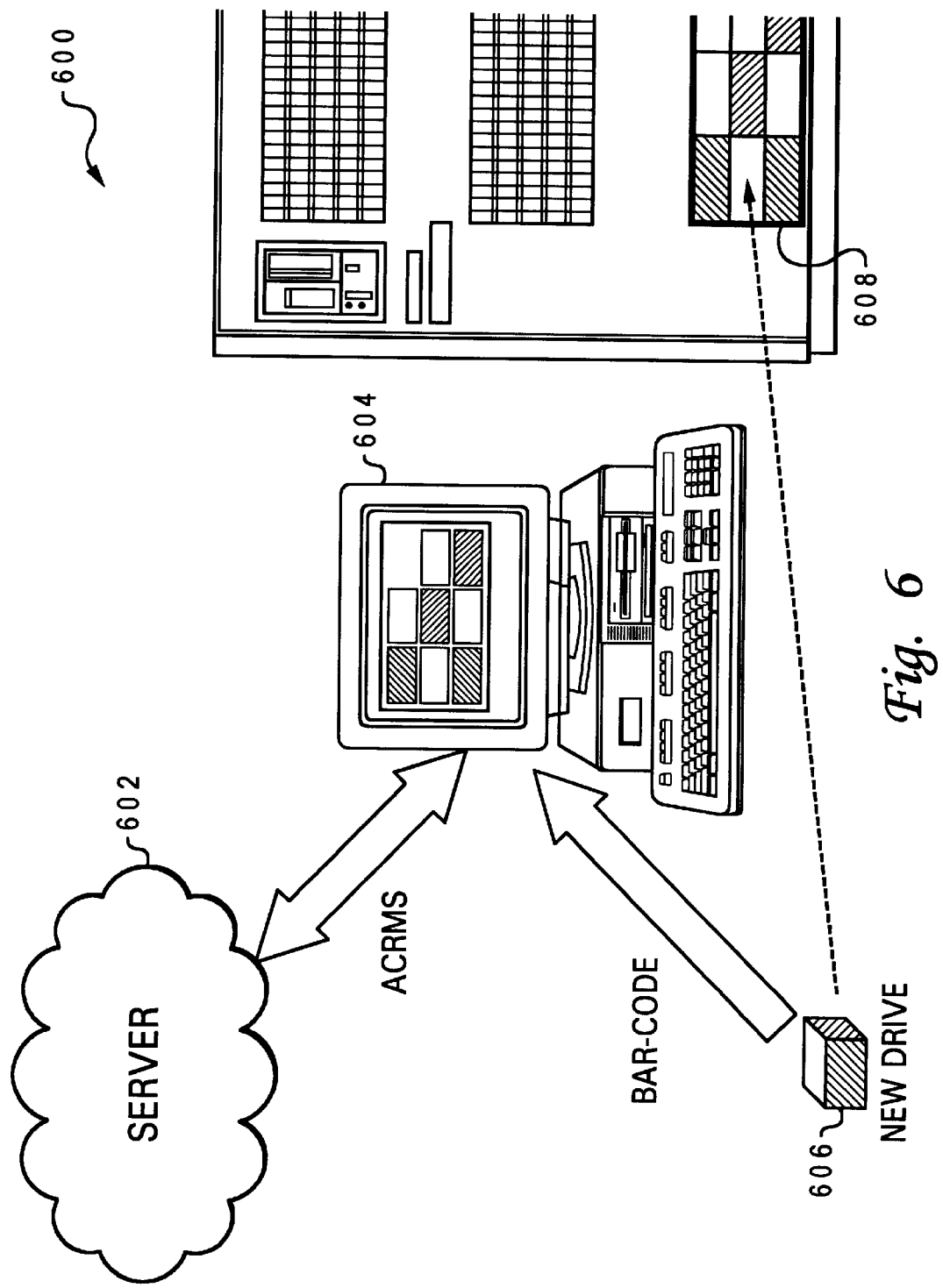

OPTIMAL LOCATION OF DRIVE ASSEMBLIES WITHIN A MULTIPLE DRIVE ARRAY

BACKGROUND OF THE INVENTION

1. Technical Field

The present invention relates in general to an improved information storage system. In particular, the present invention relates to a method and system for preventing read/write errors caused by drive assembly vibration. More particularly, the present invention relates to strategically arranging drive assemblies within a storage array so as to minimize the negative impact on drive assembly performance caused by inherent drive assembly vibration. Still more particularly, the present invention relates to a method and system for determining the vibration level of individual drive assemblies and thereafter installing drive assemblies with relatively higher vibration levels at predetermined locations within a storage array frame such that adjacent drive assemblies are minimally affected, thereby minimizing drive assembly read/write failures and the effects thereof.

2. Description of the Related Art

Generally, a digital data storage system consists of one or more storage devices that store data on storage media such as magnetic or optical data storage disks. In disk storage systems, the storage devices typically utilize a magnetic or optical medium to preserve the data. The most common data storage device has one or more generally circular disks formed from a non-magnetic substrate with a ferromagnetic coating. The disks rotate or spin, and a pivoting arm having electromagnetic transducers is utilized to read from, and write to, the disks. Both surfaces (upper and lower) of a disk can be utilized. Such a magnetic storage device is commonly referred to as a head disk assembly (HDA), and is usually packaged in a modular enclosure so that it may be easily installed in and removed from a computer system. Many computer systems utilize multiple HDAs for greater storage capability, or for fault tolerance, such as in a Redundant Array of Independent Disks (RAID) system.

A HDA is an electromechanical device that reads from and writes to disks. The main components of an HDA include a spindle on which the disk is mounted, a drive motor that spins the disk when the drive is in operation, one or more read/write heads, a second motor that positions the read/write head(s) over the disk, and controller circuitry that synchronizes read/write activities and transfers information to and from the computer. This controller circuitry, often referred to as a HDA controller, is a special purpose integrated circuit and other associated circuitry that directs and controls reading from and writing to a computer's disk drive. An HDA controller handles such tasks as positioning the read/write head, mediating between the drive and the microprocessor, and controlling the transfer of information to and from memory.

A number of known data storage systems incorporate certain techniques and devices to predict storage device failures, along with other techniques and devices to quickly recover from device failures. As discussed below, however, these systems may not be completely adequate for use in certain applications.

Predictive failure analysis (PFA) is commonly utilized in disk drive controllers and has become an industry standard as a diagnostic tool. Typically, PFA is implemented via the microcode utilized to control local disk drive operations conducted via the disk drive controller. The controller will detect that either a failure has occurred or that a disk drive failure is imminent. In response to detecting an existing or imminent error, the microcode will respond by posting an error signal. The disk drive user or the system itself may respond by taking the drive off-line or by taking data recovery action to retrieve data that was lost or compromised by the failure.

Another method of addressing drive read/write errors that is closely related to PFA is a method known as Data Recovery Procedure (DRP). An example implementation of DRP during a read operation, for example, would be if the head (the sensor) is positioned too far off the track center and the resulting poorer signal to noise ratio then causes the disk drive not being able to decode the read-back signal which then triggers the DRP. The DRP is usually a collection of operations intended to alleviate the error conditions. In the example above, one possible DRP response would be to reposition the head. DRP is therefore geared to data recovery and is invoked in-stream with the user operations (reads and writes).

Although PFA and DRP are effective in detecting and recovering from disk drive failures, they fail to address and remedy a disk drive vibration as significant cause of many such failures. Vibrations can cause problems that are addressed currently in two ways: (1) a measurement of the inherent radial vibration of a drive, referred to as root mean square of spindle runout or ACRMS, to ensure that the vibration level does not exceed a particular specified value; and (2) encoding this ACRMS information within the disk drive control circuitry thereby permitting a feedback circuit to counteract repeatable (in sync with spindle) non-uniformities within the servo controller of an individual disk drive assembly.

Although ACRMS is utilized for addressing the vibration levels of individual disk drive assemblies, the interference caused by the vibration of a first drive on other surrounding drives, such as often occurs within storage array systems such as RAID systems remains unaddressed. Currently, disk drives that have acceptable ACRMS levels, are placed into a storage array during manufacturing in a random manner. If a disk drive (referred to interchangeably as a "drive assembly") that has a relatively high (yet still within specification requirements) is placed in a drive location where it is not isolated to the greatest extent possible, or where the mounting is not as solid as it would be in another location in the frame, the vibration may cause errors on adjacent disk drives. This problem of "contaminating" good drives is well known in the field of storage arrays.

Based on the foregoing, it can be appreciated that a need exists for an improved method and system for allocating the relative locations of drive assemblies within a multiple drive array that would account for individual, inherent vibration levels of each drive assembly. Such a method and system, if implemented, would be useful by ensuring that drive assemblies with higher vibration levels are installed at locations within a particular multiple drive array frame that provide greater structural support and damping such that the negative effects of inter-drive vibration are minimized.

SUMMARY OF THE INVENTION

It is therefore an object of the invention to provide a method and system for improving an information storage system.

It is another object of the invention to provide a method and system for preventing read/write errors caused by drive assembly vibration.

It is still another object of the invention to provide a method and system for strategically arranging drive assemblies within a storage array so as to minimize the negative impact on drive assembly performance caused by inherent drive assembly vibration.

It is yet another object of the present invention to provide a method and system for determining the vibration level of individual drive assemblies and installing drive assemblies with relatively higher vibration levels at locations within a storage array such that adjacent drive assemblies are minimally affected, thereby minimizing drive assembly read/write failures and the effects thereof.

The above and other objects are achieved as is now described. A method and system are disclosed for strategically arranging drive assemblies within a multiple drive array. The multiple drive array includes a plurality of drive locations for installing the drive assemblies, each of the drive assemblies having inherent vibration levels during operation. First, a vibration classification is assigned to each drive location among a plurality of drive locations within a multiple drive array. The vibration classification corresponds to a range of measurable vibration levels acceptable at each the plurality of drive locations.

Next, a drive assembly is selected for installation and an inherent measurable vibration level of the selected drive assembly is determined. Finally, the inherent measurable vibration level of the selected drive assembly is correlated with a preferred vibration classification of a particular drive location among said plurality of drive locations, such that the selected drive assembly may be optimally located within the multiple drive array.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 4 depicts an example of fuzzy logic membership functions that may be utilized in accordance with the teachings of the present invention;

FIG. 6 illustrates a simplified drive location system utilized in a preferred embodiment of the present invention.

DETAILED DESCRIPTION OF PREFERRED EMBODIMENT

Normally, disk drive units are placed into a storage array during manufacturing in a random manner. If a disk drive that has a higher than normal vibration (yet still within specification) is placed in a slot where the mounting is not as solid as it would be in another location in the frame, the vibration may cause errors on adjacent disk drives that have normally low vibration levels. The problem of "contaminating" good drives is well known particularly with respect to multi-drive arrays such as Redundant Array of Independent Drives (RAIDS).

A common method for quantifying the inherent vibration, or other anomalies in a drive assembly, is a measurable quantity known as Root Mean Square of the Spindle Runout (ACRMS). The ACRMS of a drive assembly can be conveniently measured by examining the position error signal (PES) of a drive assembly that utilizes a sector servo system. The methods utilized to measure and average in-place PES readings and to subsequently derive an effective ACRMS value for a given drive assembly are well known in the art and are incorporated herein by reference.

Figures 5A, 5B:
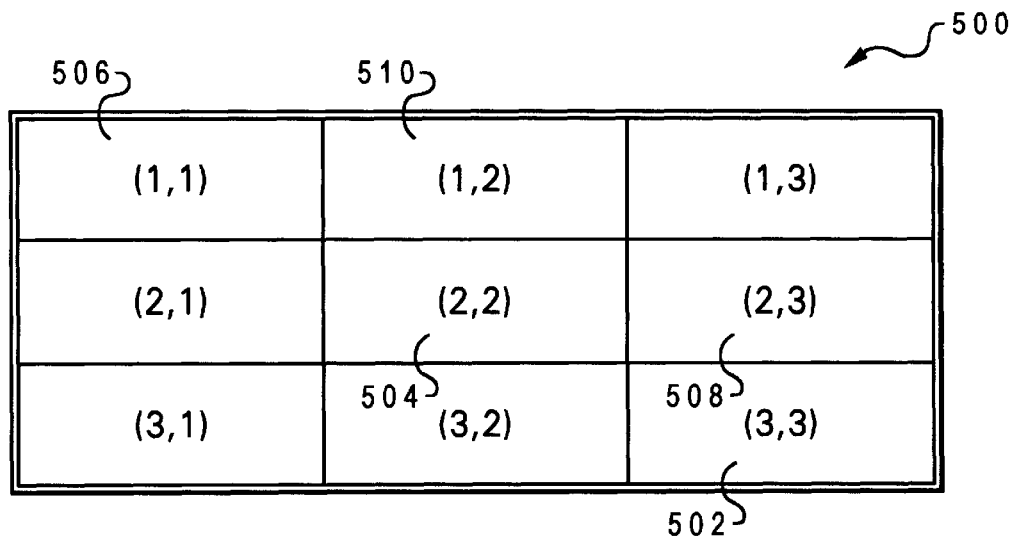
FIG. 5A illustrates a simplified graphical representation of an array of drive locations on which the method and system of the present invention may be implemented.
FIG. 5B depicts an example assignment scheme for assigning preferred vibration levels with the drive locations illustrated in FIG. 4 in accordance with the teachings of the present invention.

The method and system of the present invention ensures that disk drives with higher vibration levels (e.g. high ACRMS) are placed in locations within a frame structure where such drives are isolated, to a greater degree, than at other possible locations. For example, the corners of a 3×3 array of storage locations as depicted in FIG. 5A, offer better structural mounting and damping than the center slot (2,2). Therefore, drives with higher ACRMS should be placed in the corner slots. Drives with low ACRMS may be placed in slots with less rigidity than the corners (slot "2,2", for example).

The use of ACRMS to be described in further detail in association with FIGS. 3, 4, 5A, 5B, and 6.

Figure 1:
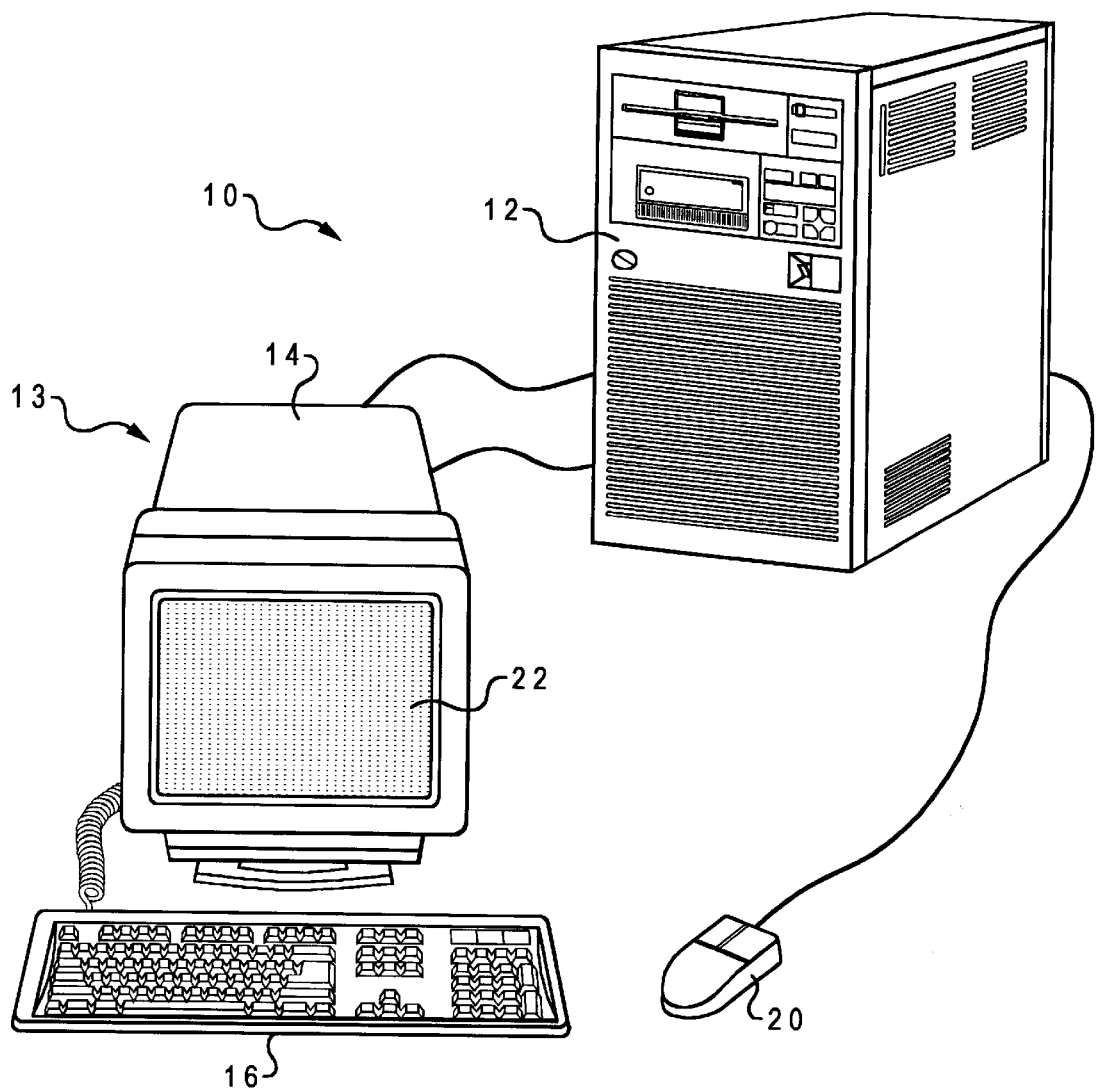
FIG. 1 illustrates a data processing system with which the method and system of the present invention may be implemented.

With reference now to the figures and in particular with reference to FIG. 1, there is depicted a pictorial representation of a data processing system with which the present invention may be implemented. As illustrated, data processing system 10 comprises a workstation 12 to which one or more nodes 13 are connected. Workstation 12 may comprise a high performance multiprocessor computer, such as the Aptiva™ computer system, a product of International Business Machines Corporation (IBM). Workstation 12 preferably includes nonvolatile and volatile internal storage for storing software applications that can be utilized in accordance with the method and system of the present invention to develop an optimal arrangement of drive assemblies within a multiple drive array. As depicted, each node 13 comprises a display device 14, keyboard 16, and mouse 20. The software applications executed within workstation 12 preferably display a graphic user interface (GUI) within display screen 22 of display device 14 with which a user can interact using a keyboard 16 and mouse 20. Thus, by entering appropriate inputs utilizing keyboard 16 and mouse 20, the user is able to develop and verify an optimal strategy for arranging drive assemblies according to the method described further hereinbelow.

Figure 2:
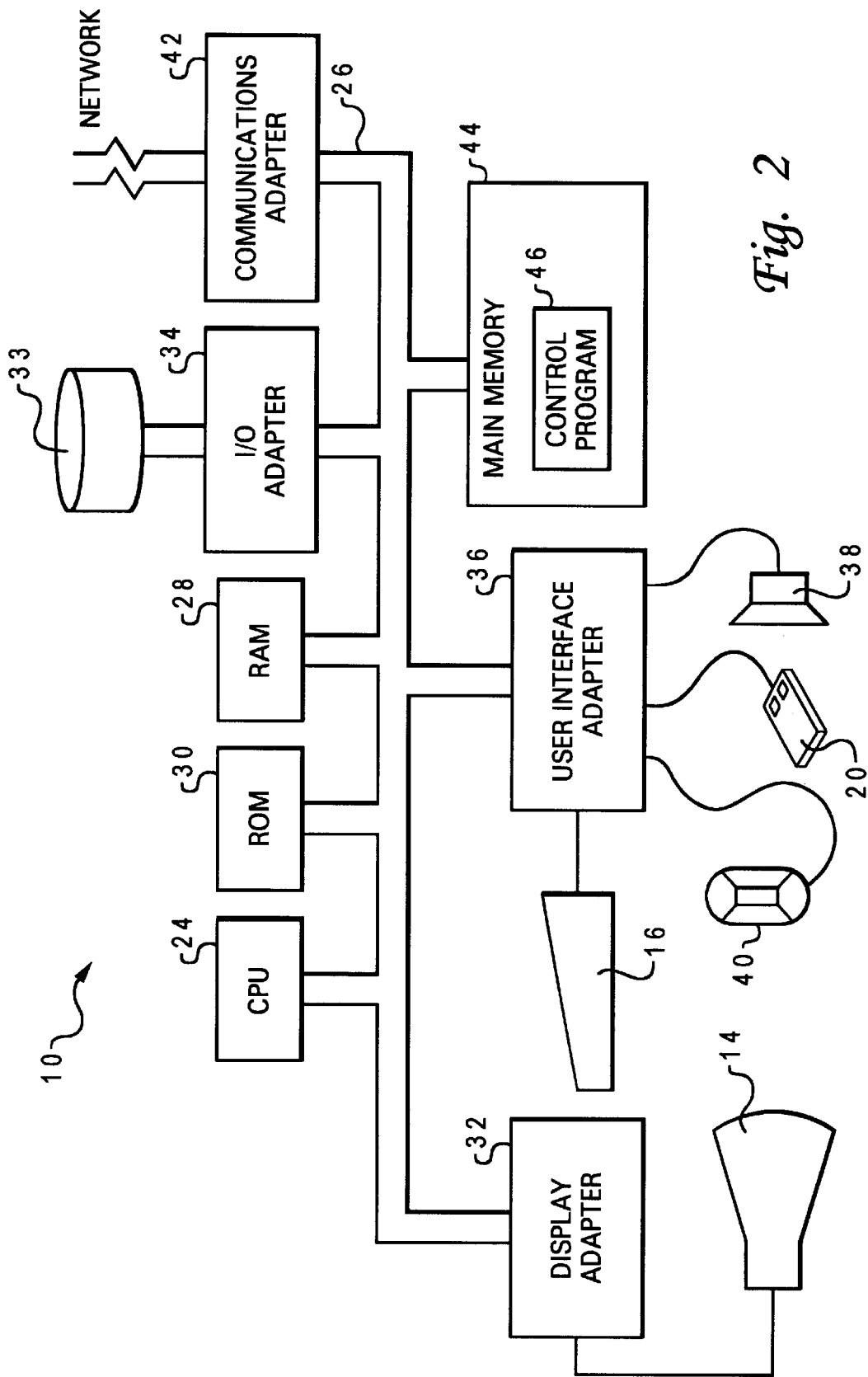
FIG. 2 depicts a representative hardware environment of the data processing system depicted in FIG. 1.

FIG. 2 depicts a representative hardware environment of the data processing system illustrated in FIG. 1. In FIG. 1 and FIG. 2, like parts are identified by like numbers. Data processing system 10 in FIG. 2 is thus a configuration that includes all functional components of a computer and its associated hardware. Data processing system 10 includes a Central Processing Unit ("CPU") 24, such as a conventional microprocessor, and a number of other units interconnected via system bus 26. CPU 24 includes a portion of data processing system 10 that controls the operation of the entire computer system, including executing the arithmetical and logical functions contained in a particular computer program. Although not depicted in FIG. 2, CPUs such as CPU 24 typically include a control unit that organizes data and program storage in a computer memory and transfers the data and other information between the various parts of the computer system. Such CPUs also generally include an arithmetic unit that executes the arithmetical and logical operations, such as addition, comparison, multiplications and so forth. Such components and units of data processing system 10 can be implemented in a system unit such as workstation 12 of FIG. 1.

Data processing system 10 further includes random-access memory (RAM) 28, read-only memory (ROM) 30, display adapter 32 for connecting system bus 26 to display device 14, and I/O adapter 34 for connecting peripheral devices (e.g., disk and tape drives 33) to system bus 26. RAM 28 is a type of memory designed such that the location of data stored in it is independent of the content. Also, any location in RAM 28 can be accessed directly without having to work through from the beginning. ROM 30 is a type of memory that retains information permanently and in which the stored information cannot be altered by a program or normal operation of a computer.

Display device 14 is the visual output of data processing system 10. Display device 14 can be a cathode-ray tube (CRT) based video display well-known in the art of computer hardware. However, with a portable or notebook-based computer, display device 14 can be replaced with a liquid crystal display (LCD) based or gas plasma-based flat-panel display. Data processing system 10 further includes user interface adapter 36 for connecting keyboard 16, mouse 20, speaker 38, microphone 40, and/or other user interface devices, such as a touch-screen device (not shown), to system bus 26. Speaker 38 is one type of audio device that may be utilized in association with the method and system provided herein to assist diagnosticians or computer users in analyzing data processing system 10 for system failures, errors, and discrepancies. Communications adapter 42 connects data processing system 10 to a computer network. Although data processing system 10 is shown to contain only a single CPU and a single system bus, it should be understood that, without departing from its spirit and scope, the method and system of the present invention may also be implemented utilizing computer systems that have multiple CPUs and to computer systems that have multiple buses that each perform different functions in different ways.

Data processing system 10 also includes an interface that resides within a machine-readable media to direct the operation of data processing system 10. Any suitable machine-readable media may retain the interface, such as RAM 28, ROM 30, a magnetic diskette, magnetic tape, or optical disk (the last three being located in disk and tape drives 33). Any suitable operating system and associated interface (e.g., Microsoft Windows) may direct CPU 24. For example, the AIX operating system and AIX windows windowing system can direct CPU 24. The AIX operating system is IBM's implementation of the UNIX™ operating system. "UNIX" is a trademark of UNIX Systems Laboratories, Inc. Other technologies also can be utilized in conjunction with CPU 24, such as touch-screen technology or human voice control.

Those skilled in the art will appreciate that the hardware depicted in FIG. 2 may vary for specific multiple drive array design and manufacturing applications. For example, other peripheral devices such as optical disk media, audio adapters, or chip programming devices, such as PAL or EPROM programming devices well-known in the art of computer hardware and the like, may be utilized in addition to or in place of the hardware already depicted. In addition, main memory 44 is connected to system bus 26, and includes a control program 46. Control program 46 resides within main memory 44, and contains instructions that, when executed on CPU 24, carries out the operations depicted in FIGS. 4, 5B, and 6, described herein.

It is important to note that, while the present invention has been, and will continue to be, described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links. Examples of transmission media include devices such as modems. Modems are communication devices that enable systems such as data processing system 10 depicted in FIG. 1 and FIG. 2 to transmit information over standard telephone lines.

Figure 3:
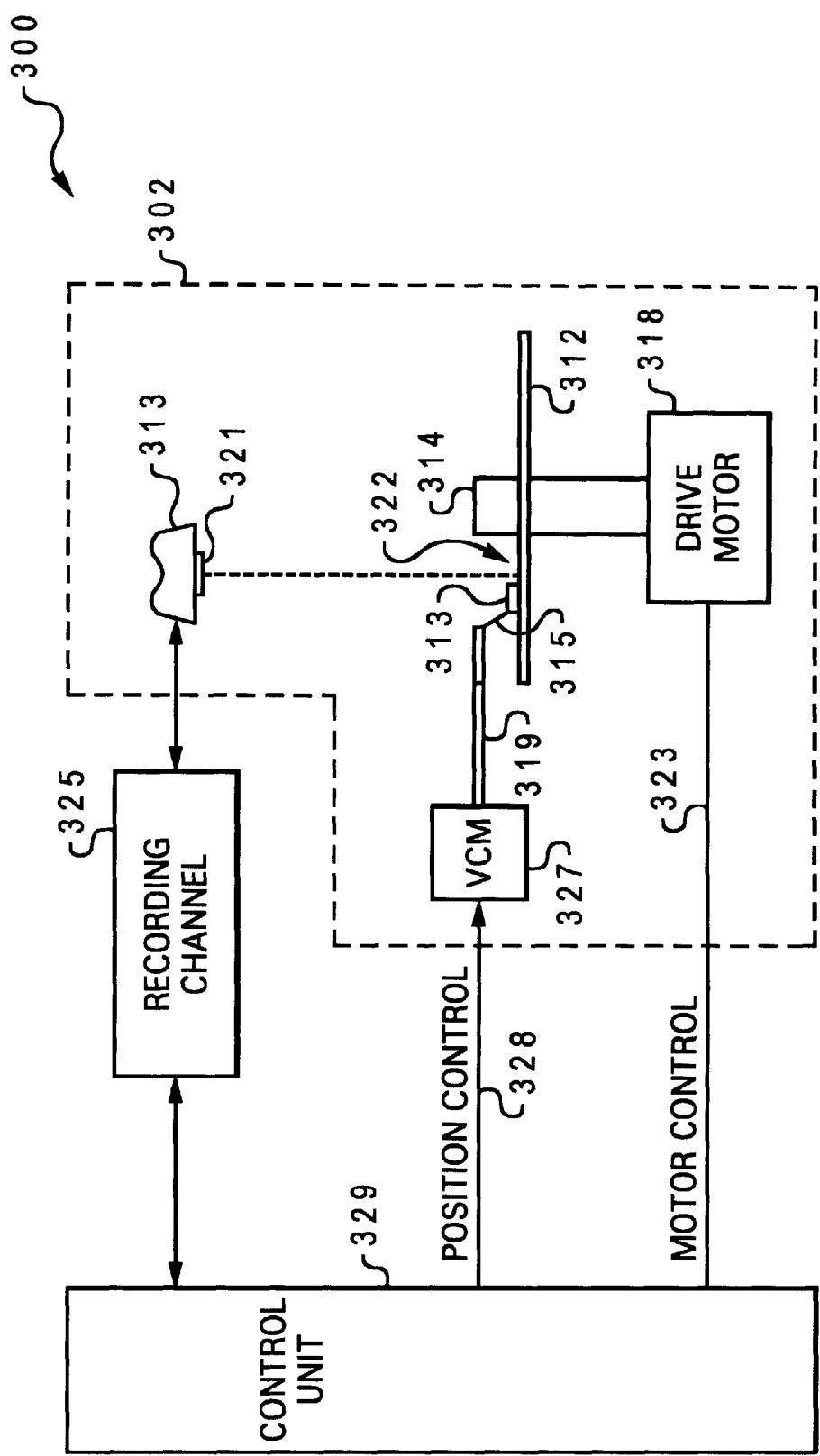
FIG. 3 illustrates a simplified diagram of a head disk assembly that may be utilized in a preferred embodiment of the present invention.

FIG. 3 depicts a block diagram of an information storage system 300 suitable for utilizing the drive arrangement of the present invention. The invention described in this application is useful with all mechanical configurations of magnetic storage disk drives or direct access storage devices (DASDs). Also, it will be appreciated that the invention is also applicable to and may be utilized by other information storage systems such as an optical data storage system or a magnetic tape recording system, for example.

Information storage system 300 includes a head disk assembly (HDA) 302, a control unit 329, and a recording channel 325. HDA 302 includes at least one rotatable magnetic disk 312 that is supported on a spindle/hub 314 and rotated by a disk drive motor 318. The magnetic recording media on each disk is in the form of an annular pattern of concentric data tracks (not shown) on disk 312. At least one slider 313 is positioned on the disk 312, each slider 313 is supporting one or more magnetic read/write heads 321. As the disk(s) rotate, the sliders 313 are moved radially in and out so that the heads 321 may access different portions of the disk surface 322 containing the data. Each slider 313 is attached to an actuator arm 319 by means of a suspension 315. The suspension 315 provides a slight spring force which biases the slider 313 against the disk surface 322. Each actuator arm 319 is attached to an actuator means 327. It should be apparent that disk storage systems may contain a large number of disks and actuators, and each actuator may support a number of sliders.

The various components of HDA 302 are controlled during operation by signals generated by control (read/write electronics) unit 329, such as access control signals and internal clock signals, and which includes logic control circuits, storage means and a microprocessor. Control unit 329 generates control signals to control various system operations such as motor control signals on line 323 and head position control signals on line 328. The control signals on line 328 provide the desired current profiles to optimally move and position a selected slider 313 to the desired data track on the associated disk 312. Read and write signals are communicated to and from read/write heads 321 by means of recording channel 325, which includes conductor lines running along suspension 315 and actuator arm 319.

HDA 302 includes several moving parts such as drive motor 318, spindle/hub 314 and their constituent components. Slight imperfections in design or manufacturing of the moving components of HDA 302 give rise to slight variations or deviations from ideal motion of these components. For example, a slight defect in construction of bearings utilized within drive motor 318 may give rise to a slightly irregular radial motion or "wobble" of spindle/hub 314. This, as well as other types of irregularities in the motion of components of HDA 302 will be referred to hereinafter simply as an inherent "vibration". A current method of measuring such inherent vibration is by determining the oscillatory PES portion of the root mean square of the spindle runout. This oscillatory PES of spindle runout is commonly referred to in the art as the "ACRMS" value of a HDA such as HDA 302.

An ACRMS value for HDA 302 is derived by in-place averaging of the Position Error Signal (PES) associated with the servo read/write system employed within HDA 302. Many HDAs such as HDA 302 are designed to include means by which its associated ACRMS value may be measured by and extracted from the PES of the servo control circuitry within HDA 302. The methods by which ACRMS are determined are well known in the art and are incorporated herein by reference. In a preferred embodiment of the present invention, the ACRMS value of a given drive assembly is utilized as an indication of the inherent vibration level of the drive assembly. Therefore, in accordance with a preferred embodiment of the present invention, the ACRMS value of HDA 302 is utilized to determine the appropriate drive location of HDA 302 with respect to at least one other drive assembly. The method and system of the present invention therefore utilizes a measurable parameter that is indicative of a potential source of inter-drive interference in order to addresses a significant, and heretofore unaddressed source of read/write failures—failures caused by non-optimal arrangement of drive assemblies. The utility of the method and system of the present invention requires a drive array that includes at least two drive assemblies. Further, the utility of the present invention requires that relative location of the multiple drive assemblies is a relevant factor in inter-drive interference. For example, many drive arrays include multiple drive locations within a single frame. The term "frame", as utilized herein, refers to any physical mounting configuration on which drive assemblies may be installed in a particular arrangement. A 3×3 matrix arrangement is depicted and described in further detail in FIG. 5A.

In FIG. 4, an example of fuzzy membership functions 400 that can be utilized to determine whether a drive assembly has a high, medium, or low ACRMS is depicted. In one embodiment of the present invention, fuzzy logic or other deterministic methods can be utilized to categorize a drive assembly as having a particular ACRMS classification. Fuzzy membership function 400 includes a "low" classification membership function 402, a "medium" classification membership function 404, and a "high" classification membership function 406. As seen in FIG. 4, the three classification membership functions span a region of measurable ACRMS values. It should be noted that the present invention provides a method and system for properly arranging drive assemblies and not for determining whether or not a given drive assembly may be utilized within an array. Therefore, the range of ACRMS values spanned by the three ACRMS classifications of fuzzy membership functions 400 all fall within an acceptable range for inclusion within a multiple drive array.

The classification scheme of fuzzy membership functions 400 is utilized to select the physical drive location (sometimes referred to as "slot location") of a drive assembly in an array frame. Note that it is possible to place drive assemblies with low, medium, or high ACRMS anywhere in an array. However, and in an important feature of the present invention, individual drive locations within a given set of drive locations may have differing structural mounting and damping characteristics. Drive locations that are located at corners of a drive array may have greater structural support and damping characteristics. Therefore, by stating a first choice of "H" for the corner slots, the present invention may be utilized to ensure that potentially problematic drives (those with relatively high ACRMS values) are somewhat isolated and placed at a location where their inherent vibration will be counteracted to the greatest extent possible. Therefore, present invention ensures that drives with relatively high vibration levels, as measured by their ACRMS, are assigned to drive locations where they can influence other drive assemblies the least. Other schemes for locating drives based on ACRMS are of course possible.

Turning now to FIG. 5A there is depicted a simplified graphical representation of an array 500 of drive locations on which the method and system of the present invention may be implemented. Note that array 500 is a 3×3 matrix with each cell in the matrix denoting a drive location. It should be noted that cell (2,2) 504 represents a drive location that is surrounded on all sides by other drive locations. Therefore, a drive assembly, such as HDA 302, that is installed at cell (2,2) 504 is in a position to adversely affect a maximum number of adjacent drives if it has a relatively high inherent vibration level. Similarly, but to a lesser extent, cells 508 and 510 are located on edges of array 500 and therefore are more isolated than cell 504 from surrounding drive locations. The maximum possible isolation within array 500 is of course at the corner cells such as cells 502 and 506.

The inherent vibrations of drive assemblies installed at relatively isolated drive locations will have less adverse consequences on the operations of the multiple drive array as a whole. In addition to this isolation effect, however, and as an important feature of the present invention, the physical support structure of a multiple drive array, such as array 500 is likely to differ among the various drive locations. For example, cells located at the corners of an array (usually contained within a particular type of frame) such as cells (1,1) 506 and (3,3) 502 are likely to have greater structural support and therefore greater damping characteristics than center cell 504. Therefore the benefit of categorizing drive locations according to a preferred vibration classification is two-fold: first, "mischievous" drives (those having relatively high vibration levels as measured by ACRMS) are located in relative isolation; and second, the isolated locations (i.e. corner locations) are often those with the greatest ability to minimize or counteract the inherent vibrations from a drive assembly installed thereon.

Turning to FIG. 5B, there is illustrated a hypothetical assignment of the vibration classifications depicted in FIG. 4 with the drive assembly locations represented by the cells within array 500. The vibration classification assignment scheme of FIG. 5B is consistent with a preferred embodiment of the present invention in which a set of choices are presented for locating a drive assembly based on its ACRMS value. The ACRMS value, which is measured when the drive assembly is manufactured, may be identified on a label on the drive or by other means. Recalling from FIG. 4, "high", "medium", and "low" are the three choices given that cover the entire range of measurable ACRMS levels. By utilizing all three ACRMS classifications in descending order of preferred assignment, the assignment scheme illustrated in FIG. 5B ensures that there will be a 100% likelihood that all drive assemblies, as received, can be placed without "hunting" for the right ACRMS drive for a particular slot.

With reference now to FIG. 6, there is illustrated a simplified example of a complete locating system 600 in accordance with the teachings of the present invention. At a manufacturing station where an array subsystem is being assembled, drive assemblies, such as new drive 606 are unpacked and the bar-code information is passed on to a network server 602 via a network computer 604 at the station. Network server 602 finds an ACRMS level that corresponds to the bar-code on new drive 606 and conveys this information back to network computer 604. A user of network computer 604, utilizing an assignment scheme similar to that depicted in FIG. 5A and FIG. 5B, may identify on the computer screen where new drive 606 should be inserted into the frame (not depicted) in which a multiple drive array is to be installed. As illustrated in FIG. 6, all but two of the drives within a 9-drive array frame 608 have been inserted. The color coding is only meant to show the one-to-one correlation between the computer display and the location of drives in a frame.

Figure 7:
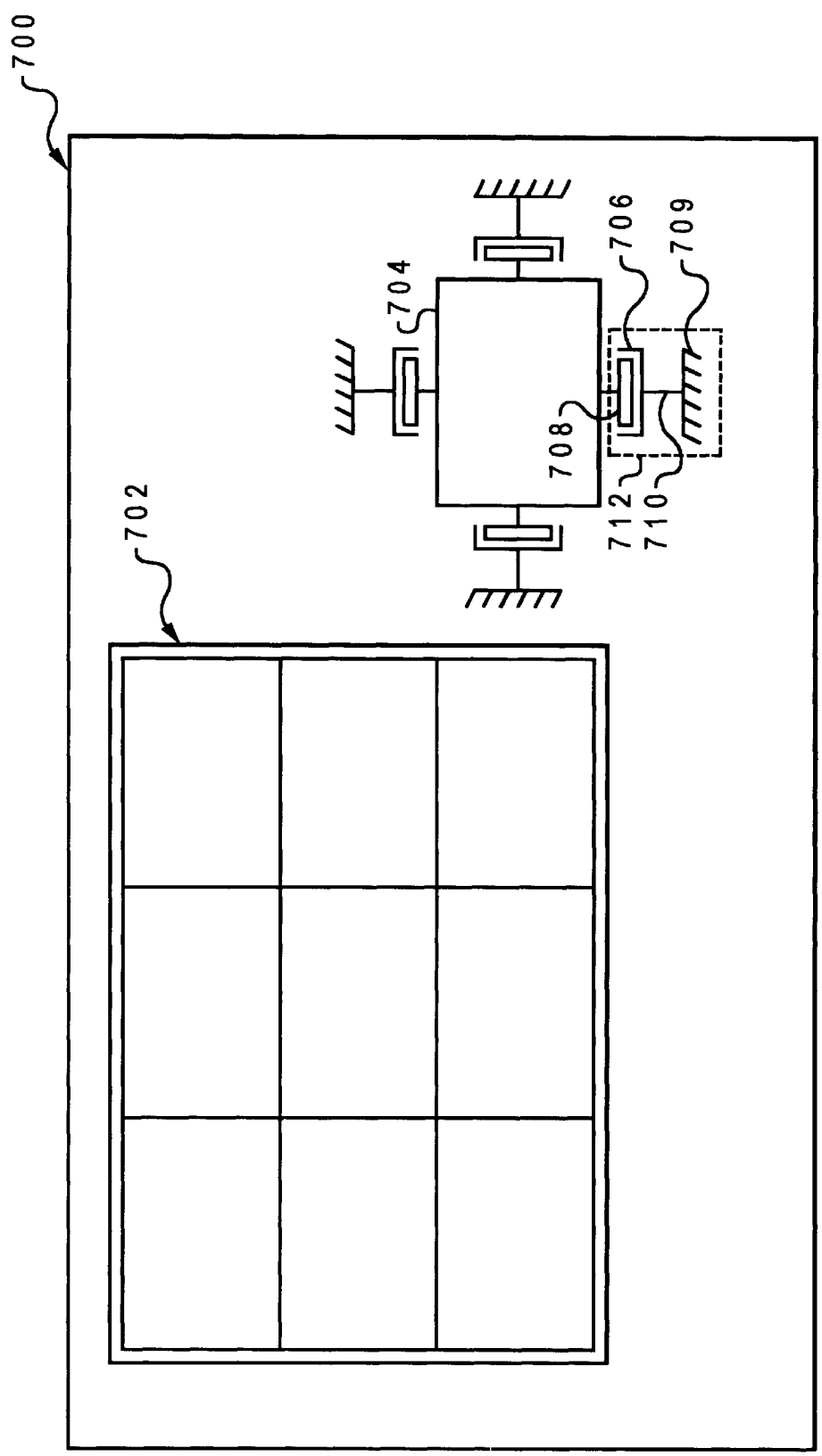
FIG. 7 depicts a drive isolation fixture apparatus that may be utilized in an alternate embodiment of the present invention.

It should be noted that although the description provided in association with FIG. 6 refers to the initial placement of drive assemblies within a storage array, similar methods may be utilized in arranging or rearranging drive assemblies at any time without departing from the spirit and scope of the present invention. Turning now to FIG. 7, there is depicted a drive isolation fixture apparatus that may be utilized in an exemplary embodiment of the present invention. The drive isolation apparatus depicted in FIG. 7 may be utilized as an aid in examining drive arrangement, such that optimal drive assembly arrangement may be maintained after an initial arrangement has been determined as described in FIG. 6. As previously explained, an ACRMS value for a drive assembly is initially determined in order to ascertain the drive assembly's inherent vibration level. After a drive assembly has been operating over a period of time, however, its inherent vibration level may change. This change in inherent vibration level may be due to "disk slip" or other similar variable mechanical attributes of moving parts within the drive assembly that change over time. Disk slip as well as other sources of vibration may be caused or aggravated by several sources such as mechanical shock to the storage array, installation and reinstallation of drives, etc.

A simplified representation of an array housing 700 is illustrated which contains features that may be utilized in accordance with the teachings of the present invention to "adjust" the arrangement of drive assemblies within a storage array after initial placement. Array housing 700 includes a frame 702 that contains a plurality of drive assemblies arranged in a 3×3 array. Array housing 700 also includes an independent fixture 704 for providing a mechanically buffered environment. This buffered environment permits isolation of a drive assembly placed within independent fixture 704 from external vibrations caused by drive assemblies within frame 702, for example. Although independent fixture 704 is depicted as residing outside frame 702, it should be noted that this arrangement is provided for convenience of illustration and that, consistent with the spirit and scope of the present invention, independent fixture 704 may be located within frame 702.

As illustrated in FIG. 7, independent fixture 704 is mechanically isolated from its immediate environment through the utilization of dampers 712 that each consist of movable coupling parts 708 and stationary coupling parts 706. The terms "movable" and "stationary" are utilized in reference to array housing 700, to which stationary coupling parts 706 are rigidly coupled to via supports 710 and housing contacts 709.

In a preferred embodiment of the present invention a drive assembly located in frame 702 that is suspected of vibrating excessively (i.e. having developed a higher ACRMS or other vibration indicator) may be placed into independent fixture 704 for the purpose of assessing inherent vibration levels of the drive assembly. Once an inherent vibration level, as measured by ACRMS or other means, has been determined in the isolation of independent fixture 704, a determination may be made whether the drive assembly should be replaced or relocated within the array of drives within frame 702. The availability of independent fixture 704 may prove advantageous over simply performing vibration measurements on a particular drive assembly in its original drive location since a more accurate inherent vibration level can be obtained when the drive assembly is mechanically isolated.

It is important to note that, while the present invention has been, and will continue to be, described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links.

Preferred implementations of the invention include implementations as a computer system programmed to execute the method or methods described herein, and as a program product. According to the computer system implementation, sets of instructions for executing the method and methods are resident in ROM or other main storage in one or more computer systems configured generally as described in FIG. 2 above. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the present invention, as depicted in FIG. 6, can be accomplished with a computer-aided device. In such a method, data stored in a memory unit of a data-processing system such as a network computer 604, can represent steps in a method for implementing a preferred embodiment of the present invention.

While the invention has been particularly shown as described with reference to a preferred embodiment, it will be understood by those skilled in the art that various changes in form and detail may be made therein without departing from the spirit and scope of the invention. For example, the present invention is applicable to any storage system in which at least two moving or otherwise vibrating drive assemblies are utilized. These may include, but are not limited to magnetic head disk assemblies, optical disk drives as well as tape drives whose operation involves the possibility of vibration that may interfere with the operation of adjacent drives. It is therefore contemplated that such modifications can be made without departing from the spirit or scope of the present invention as defined in the appended claims.

What is claimed is:

1. A method for strategically arranging drive assemblies within a multiple drive array, said multiple drive array including a plurality of drive locations for installing said drive assemblies, each of said drive assemblies having inherent vibration levels during operation, said method comprising the steps of:

assigning a vibration classification to each drive location among a plurality of drive locations within a multiple drive array, said vibration classification corresponding to a range of measurable vibration levels acceptable at each of said plurality of drive locations;

determining an inherent measurable vibration level of a selected drive assembly, said selected drive assembly to be installed within one of said drive locations; and selecting a drive location for said selected drive assembly from among said plurality of drive locations such that said determined inherent measurable vibration level falls within the assigned vibration classification of said selected drive.

2. The method of claim 1 wherein said step of assigning a vibration classification to each drive location among a plurality of drive locations within a multiple drive array, is preceded by the step of defining a plurality of distinct vibration classifications, each vibration classification among said plurality of vibration classifications corresponding uniquely to a range of said inherent measurable vibration levels.

3. The method of claim 2 wherein said step of defining a plurality of distinct vibration classifications comprises the step of defining a plurality of distinct ACRMS classifications, each ACRMS classification among said plurality of distinct ACRMS classifications corresponding uniquely to a range of measurable ACRMS levels.

4. The method of claim 3 wherein said step of assigning a vibration classification to each drive location among a plurality of drive locations within a multiple drive array, comprises the step of assigning an ACRMS classification, among said plurality of ACRMS classifications, to each drive location among said plurality of drive locations within said multiple drive array.

5. The method of claim 4 wherein said step of determining an inherent measurable vibration level of a selected drive assembly, comprises the step of determining an ACRMS level of a drive assembly, said drive assembly to be assigned to one of said drive locations within said multiple drive array.

6. The method of claim 5 wherein said step of selecting a drive location comprises the step of matching said determined ACRMS level of said drive assembly with a preferred ACRMS classification.

7. The method of claim 2 wherein said step of assigning a vibration classification to each drive location among a plurality of drive locations within a multiple drive array, further comprises the steps of:

ascertaining a damping characteristic of each of said plurality of drive locations; and matching said damping characteristic with said plurality of vibration classifications.

8. A system for strategically arranging drive assemblies within a multiple drive array, said multiple drive array including a plurality of drive locations for installing said drive assemblies, each of said drive assemblies having inherent vibration levels during operation, said system comprising:

processing means for assigning a vibration classification to each drive location among a plurality of drive locations within a multiple drive array, said vibration classification corresponding to a range of measurable vibration levels acceptable at each of said plurality of drive locations;

processing means for determining an inherent measurable vibration level of a selected drive assembly, said selected drive assembly to be installed within one of said drive locations; and processing means for selecting a drive location for said selected drive assembly from among said plurality of drive locations such that said determined inherent measurable vibration level falls within the assigned vibration classification of said selected drive.

9. The system of claim 8 wherein said means for determining an inherent measurable vibration level of a selected drive assembly comprises:

an independent fixture for isolating said selected drive assembly, such that inherent vibration measurements may be performed on said selected drive assembly.

10. The system of claim 9 wherein said independent fixture is a mechanically buffered drive location in which said selected drive assembly may be individually examined.

11. The method of claim 9 wherein said independent fixture is a self-contained module on which inherent vibration measurements may be performed on said selected drive assembly.

12. A program product for strategically arranging drive assemblies within a multiple drive array, said multiple drive array including a plurality of drive locations for installing said drive assemblies, each of said drive assemblies having inherent vibration levels during operation, said program product comprising:

instruction means stored in signal bearing media for assigning a vibration classification to each drive location among a plurality of drive locations within a multiple drive array, said vibration classification corresponding to a range of measurable vibration levels acceptable at each of said plurality of drive locations;

means for determining an inherent measurable vibration level of a selected drive assembly, said selected drive assembly to be installed within one of said drive locations; and instruction means stored in signal bearing media for selecting a drive location for said selected drive assembly from among said plurality of drive locations such that said determined inherent measurable vibration level falls within the assigned vibration classification of said selected drive.

13. The program product of claim 12 wherein said instructions means for assigning a vibration classification to each drive location among a plurality of drive locations within a multiple drive array, further comprises instruction means stored in signal bearing media for defining a plurality of distinct vibration classifications, each vibration classification among said plurality of vibration classifications corresponding uniquely to a range of said inherent measurable vibration levels.

14. The program product of claim 13 wherein said instruction means stored in signal bearing media for defining a plurality of distinct vibration classifications, further comprises instruction means stored in signal bearing media for defining a plurality of distinct ACRMS classifications, each ACRMS classification among said plurality of distinct ACRMS classifications corresponding uniquely to a range of measurable ACRMS levels.

15. The program product of claim 14 wherein said instruction means for assigning a vibration classification to each drive location among a plurality of drive locations within a multiple drive array, comprises instruction means for assigning an ACRMS classification, among said plurality of ACRMS classifications, to each drive location among said plurality of drive locations within said multiple drive array.

16. The program product of claim 15 wherein said means for determining an inherent measurable vibration level of a selected drive assembly, comprises means for determining an ACRMS level of a drive assembly, said drive assembly to be assigned to one of said drive locations within said multiple drive array.

17. The program product of claim 16 wherein said instruction means for selecting a drive location comprises instruction means for matching said determined ACRMS level of said drive assembly with a preferred ACRMS classification.

18. The method of claim 13 wherein said instruction means for assigning a vibration classification to each drive location among a plurality of drive locations within a multiple drive array, further comprises:

means for ascertaining a damping characteristic of each of said plurality of drive locations; and instruction means stored in signal bearing media for matching said damping characteristic with said plurality of vibration classifications.

* * * * *